United States Patent [19]

Frulla et al.

[11] 4,092,343

[45] May 30, 1978

[54] POLYMETHYLENE POLYPHENYL POLYISOCYANATE

[75] Inventors: Floro F. Frulla, Wallingford; Adnan A. R. Sayigh, North Haven; Henri Ulrich, Northford; Peter J. Whitman, Hamden, all of Conn.

[73] Assignee: The Upjohn Company, Kalamazoo, Mich.

[21] Appl. No.: 797,545

[22] Filed: May 16, 1977

Related U.S. Application Data

[62] Division of Ser. No. 598,794, Jul. 24, 1975, Pat. No. 4,039,580.

[51] Int. Cl.$^2$ ............... C07C 119/048; C07C 118/02
[52] U.S. Cl. ..................... 260/453 AM; 260/453 PH
[58] Field of Search ................. 260/453 AM, 453 PH

[56] References Cited

U.S. PATENT DOCUMENTS

| | | | |
|---|---|---|---|
| 3,362,979 | 1/1960 | Bentley | 260/453 AM |
| 3,676,497 | 7/1972 | Recchia et al. | 260/570 |
| 3,857,890 | 12/1974 | Recchia et al. | 260/570 |

FOREIGN PATENT DOCUMENTS

| | | |
|---|---|---|
| 963,422 | 7/1964 | United Kingdom. |
| 1,163,810 | 9/1969 | United Kingdom. |

*Primary Examiner*—Dolph H. Torrence
*Attorney, Agent, or Firm*—Denis A. Firth; John Kekich

[57] ABSTRACT

A process is described for the preparation of polymethylene polyphenyl polyamines containing from 40 to 60 percent by weight of diamine and also containing markedly less high molecular weight polyamines than products hitherto available. Phosgenation of the polyamines gives the corresponding mixture of polymethylene polyphenyl polyisocyanates of markedly lower viscosity and lighter color than products hitherto available, and yielding polymer foams which are substantially white in color.

The process comprises condensing aniline and formaldehyde (molar ratio 4-10:1) in the absence of catalyst, separating water from the resulting aminal mixture, contacting the aminals at 20° C to 60° C with a solid catalyst (diatomaceous earths, clays, zeolites) until formation of benzylamines is substantially complete, distilling aniline from the resulting benzylamines under reduced pressure and below 150° C until the aniline content is 3 to 22 percent by weight, and contacting the resulting product with a solid catalyst (diatomaceous earths, clays, zeolites) at 100° C to 190° C until conversion to polymethylene polyphenyl polyamines is complete.

1 Claim, No Drawings

POLYMETHYLENE POLYPHENYL POLYISOCYANATE

This is a division of application Ser. No. 598,794 filed July 24, 1975, now Pat. No. 4,039,580.

BACKGROUND OF THE INVENTION

1. Field of the Invention

This invention relates to the preparation of polymethylene polyphenyl polyamines and is more particularly concerned with the condensation of aniline and formaldehyde under conditions of heterogeneous catalysis.

2. Description of the Prior Art

The preparation of mixtures of methylene bridged polyphenyl polyamines containing diaminodiphenylmethanes by condensation of aniline and formaldehyde under aqueous condition in the presence of mineral acids, particularly hydrochloric acid, has been widely described. Illustrative of such processes are those shown in U.S. Pat. Nos. 2,638,730; 2,950,263; 3,260,751; 3,277,173; 3,297,759; and 3,476,806.

Such processes, in one form or another, are widely used commercially to prepare the polyamines in question, which polyamines are employed as intermediates in the preparation of the corresponding isocyanates, i.e. diisocyanatodiphenylmethane and mixtures of polymethylene polyphenyl polyisocyanates. The isocyanates are employed in the preparation of a wide variety of polyurethanes, polyisocyanurates and other polymers (both cellular and non-cellular) which can be derived from polyisocyanates.

However, the operation of processes catalyzed by aqueous mineral acid of the type described above necessarily gives rise to serious corrosion problems, involving constant repair and maintenance requirements, and increasing overhead costs in the operation of the manufacturing plants in which such processes are utilized.

Very little attention has been devoted hitherto to utilizing catalysts of a relatively non-corrosive nature. U.S. Pat. No. 3,362,979 describes the use of siliceous catalysts at elevated temperatures (125° to 300° C preferred). The aniline and aqueous formaldehyde are brought together in the presence of the catalyst at a temperature in the above range and the water (i.e. the water introduced with the formaldehyde, as well as the water of condensation eliminated in the reaction) is removed from the reaction mixture on a continuous basis. Such a procedure does not lend itself readily to operation on a continuous basis on a commercial scale. Further, the diamine content in the product in many instances contains excessively high proportions of 2,4'-isomer.

British Specification No. 1,207,377 describes a very similar process, i.e. reaction of aromatic amine and formaldehyde at elevated temperatures with continuous removal of water, but using a catalyst comprising a benzene sulfonic acid supported on a substrate. No details are given of the results of application of the process to the condensation of aniline and formaldehyde, all the specific examples being devoted to the condensation of either mono-or dichloroaniline with formaldehyde.

French Patent Specification No. 1,448,359 shows a similar process using, for example, a bentonite clay with removal of water from a mixture of aniline and formaldehyde while the latter is refluxed in the presence of the clay catalyst.

The above procedures have, in our hands, been found to give rise to rapid deactivation of the catalyst with consequent need to reactivate the catalyst after each run. The procedures are not readily adapted to continuous operation on the commercial scale.

We have now found that the condensation of aniline with formaldehyde, and the conversion of the initial condensation product to the desired polyamines, can be effected using heterogeneous catalysis using improved procedures which are free from the problems discusssed above. Not only do the procedures described below have the advantage of being corrosion free, but they also have been found to yield results which are unexpected and highly useful.

SUMMARY OF THE INVENTION

This invention comprises a process for the preparation of a mixture of di(aminophenyl)methanes and oligomeric polymethylene polyphenyl polyamines wherein the diamine content is within the range of 40 to 60 percent by weight, which process comprises the steps of (a) reacting aniline and formaldehyde in a proportion within the range of 4 moles to 10 moles of aniline per mole of formaldehyde at a temperature of about 20° C to about 60° C and in the absence of catalyst to form a mixture of aminals;

(b) separating water from said aminals;

(c) contacting the aminals so obtained with a solid catalyst selected from the class consisting of diatomaceous earths, clays, and zeolites at a temperature of about 20° C to about 55° C until from 80 to 100 percent by weight of the aminals has been converted to benzylamines;

(d) subjecting the benzylamines so obtained to distillation under reduced pressure at a temperature not greater than 150° C to remove aniline until the aniline content of the undistilled fraction is within the range of about 3 to about 22 percent by weight; and (e) contacting said undistilled fraction with a solid catalyst selected from the class consisiting of diatomaceous earths, clays, and zeolites at a temperature of 100° C to 190° C until conversion to methylene polyphenyl polyamines is complete.

The invention also comprises the polyamines produced by the above process and the polyisocyanates derived by phosgenation of said polyamines.

DETAILED DESCRIPTION OF THE INVENTION

In the first step of the process of the invention aniline and formaldehyde are brought together in the absence of acid or any other catalyst hitherto employed in the art. The reaction is conducted substantially in accordance with the procedure described by Cohn, Zeitschrift für Ang. Chem., XIV, 1901, 311. Thus, the aniline and formaldehyde are brought together in any convenient manner, advantageously with stirring. The aniline can be added to the formaldehyde or vice versa. However, it is preferred to add the formaldehyde to the aniline. The formaldehyde is preferably in the form of an aqueous solution, i.e. in the form of the 37 percent aqueous solution which is the form most readily available commercially. However, the formaldehyde can also be used in one of its polymerized forms, i.e. as paraformaldehyde or trioxymethylene, if desired. The temperature at which the reactants are brought together is not critical. For the sake of convenience the reactants are generally brought together at ambient temperatures (circa 20° to 25° C) but higher (up to 60° C) or lower (down to 0° C) temperatures can be employed if desired. The reaction is exothermic but can be readily controlled either by appropriately adjusting the rate of addition of reactant or by applying external cooling, if necessary. Although, as indicated previously, the reaction temperature in this stage of the reaction is not critical it is preferable that the temperature of the reaction mixture does not rise above about 60° C.

The reaction taking place between the aniline and formaldehyde in this phase of the reaction is rather complex but the simplest reaction occurring can be represented by the following equation:

$$C_6H_5NH_3 + HCHO \rightarrow C_6H_5N = CH_2 + H_2O \qquad (1)$$

i.e. equimolar proportions of aniline and formaldehyde condense with the elimination of a molecule of water and the formation of the compound (I) which has been referred to in the earlier literature as "anhydroformaldehyde aniline" (see Cohn, supra).

As will be appreciated by one skilled in the art, the compound (I) can undergo further condensation. Illustratively, the following reaction involving a second molecule of aniline can occur:

$$C_6H_5N = CH_2 + C_6H_5NH_2 \rightarrow C_6H_5NH-CH_2-NHC_6H_5 \qquad (II)$$

The latter compound, N,N'-diphenylmethylenediamine, is substantially the sole product of the aniline-formaldehyde condensation when the molar proportion of aniline to formaldehyde is within the above-defined ratio. When the molar proportion of aniline to formaldehyde falls below about 3:1 it is found that the compound (II) undergoes further condensation with aniline and formaldehyde to form more complex molecules. The compound (II), and any such more complex reaction products, will be referred to hereinafter collectively as "aminals".

Since, as indicated above, the molar proportion of aniline to formaldehyde is always at last 4:1, the reaction product obtained in the above described process will be a mixture of aminals and excess aniline.

It has been found that the use of smaller molar proportions of aniline to formaldehyde than 4:1 leads to the formation of significant amounts of undesirable by-products in the complete process of the invention. Chief of said by-products are the N-methyl substituted derivatives of the desired end products.

While the lower limit of the molar proportion of aniline to formaldehyde employed in the first stage of the reaction is dictated by the desire to avoid the production of undesired by-products, the upper limit is not critical and is dictated largely by economic considerations. While any of the molar proportions of aniline to formaldehyde discussed above can be used in the process of the invention, a preferred proportion is within the range of 5:1 to 7:1 and a most preferred proportion is about 6:1.

The reaction between the aniline and formaldehyde in the first step of the process of the invention occurs very rapidly even at ambient temperatures. The progress of the reaction can be followed by conventional analytical techniques, e.g. by following the disappearance of formaldehyde from the reaction mixture. When the reaction is observed to have processed to completion, the next stage of the process of the invention is initiated.

In the second stage of the process of the invention, the water of condensation eliminated in the first stage of the process is separated from the reaction mixture. Since the water separates as a distinct layer in the reaction mixture, the separation can be carried out simply by siphoning off or decanting the organic layer from the aqueous layer. However, in a preferred embodiment of the process of the invention, the last traces of water are removed from the organic layer by distillation or like techniques. Accordingly, in the preferred embodiment, it is convenient to carry out the separation of the organic and aqueous layers by simple distillation, long tube evaporation, and like methods, under reduced pressure.

Advantageously, the mixture of aminals, when freed from water in accordance with the preferred embodiment as described above, contains not more than about 3.5 percent by weight of water and, preferably, contains not more than 0.1 percent by weight of water.

In the next step of the process of the invention, the aminals, whether dried in the above manner or simply separated from the aqueous layer in the previous step, are contacted with a solid catalyst at a temperature of about 20° C to about 60° C until from about 80 percent to about 100 percent of said aminals has been converted to benzylamines. The solid catalysts which are employed in this step of the process of the invention can be diatomaceous earths, clays, or zeolites.

The diatomaceous earths are a well-known class of siliceous materials derived from diatoms and are inclusive of kieselguhr, tripolite, diatomite, infusorial earth and the like.

The clays employed in the process of the invention can be any of the clays conventionally employed in the catalytic art. Such clays include the naturaly occurring and synthetic alumina silicates and are a well-recognized claass of materials. Illustrative of such clays are: attapulgus clay, kaolins and montmorillonite clays including fuller's earth, bentonite, montmorillonite and the like.

A wide variety of such clays is available commercially. For example, kaolin clays in various particle sizes are available from the J-M. Huber Corporation, Huber, Ga., and from Air Products and Chemicals, Inc. Bentonite clays in a variety of grades are available from the George Kaolin Company, or under the trade name Filtrol from the Filtrol Corporation, Los Angeles Ca. Montmorillonite clays mined in South Central Texas are available under the trade name Impact from the Milwhite Company, Houston, Tx.

The clays can generally be used in the state in which they are available commercially without any further treatment. However, it is generally found desirable to subject the clays to a drying process prior to use. Such drying can be accomplished by heating the clay, advantageously under nitrogen or under reduced pressure, to a temperature within the range of about 100° C to 500° C to remove some, or the bulk, of the occluded water in the clay.

A particularly preferred clay for use in the process of the invention is attapulgus clay.

The natural and synthetic zeolites, employed as catalysts in the process of the invention, are also a well-recognized class of materials. The synthetic zeolites are described, for example, in R. W. Grimshaw, The Chemistry and Physics of Clay, Fourth Edition Revised, 1971, pp. 168-9, Ernest Benn, Limited, London, and in D. W. Breck, Zeolite Molecular Sieves, John Wiley and Sons, New York. The zeolites are hydrated aluminosilicates having a relatively open crystal lattice which can be readily synthesized and which can be subjected to cation exchange to produce forms having different cations. Any of these known zeolites, in any of the different cation states, can be employed in the process of the invention. The naturally occurring zeolites are sodium and calcium aluminosilicate such as anocite, chabazite, heulandite, notrolite, stilbite, faujasite, and thomsonite; see, for example, Encyclopedia of Chemical Technology, Vol. 12, p. 295, 1954, Interscience Publishers Inc., New York, N.Y. A particularly useful group of zeolites for use in the present invention is the group of synthetic X and Y zeolites.

Advantageously the diatomaceous earth, clays or zeolites used in the process of the invention are employed in powder form. By this is meant that the average particle size of the solis catalyst is advantageously below about 20 microns (or about 65 mesh). A number of the solid catalysts of the invention are available in the form of pellets of various sizes, as extrudates, and as irregular granules, and such forms are particularly useful for continuous flow reactions which will be described hereinafter.

The amount of solid catalyst employed in converting the aminal mixture to benzylamines is advantageously within the range of about 1 to about 10 percent by weight based on the mixture of aminals to be treated though higher amounts of catalyst can be used if desired. Preferably the amount of solid catalyst employed in the conversion is within the range of about 4 to about 6 percent by weight based on aminals. It is to be clearly understood, however, that the upper limit of proportion of solid catalyst is not critical as far as successful operation of the process is concerned. The upper levels of proportion set forth above are based on economic considerations only.

In carrying out the conversion of the aminals, the mixture of aminals and aniline and the solid catalyst are brought together in appropriate fashion. For example, the two components are mixed in any order and subjected to stirring in a batch type vessel. Alternatively, as will be discussed in more detail hereafter, the solid catalyst is packed in a column and the aminal is allowed to pass through the column at any desired rate.

Whatever procedure is adopted for contacting the amimals and solid catalyst the mixture of the two components is maintained at a temperature in the range of 20° C to about 60° C until such time as it is determined that from about 80 to about 100% of the original aminals have been converted to the corresponding benzylamines. The conversion is represented, in the case of the simplest aminal namely, N,N'-diphenylmethylenediamine (II), by the following reaction scheme:

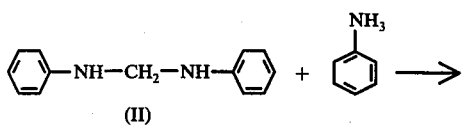

(II)

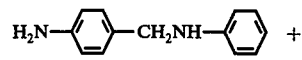

-continued

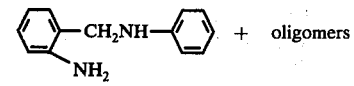

The more complex aminals, if any, present in the aminal mixture rearrange in similar fashion to form corresponding benzylamines.

The progress of the conversion of the mixture of aminals and aniline to benzylamines can be followed readily by subjecting aliquots of the reaction mixture to conventional analytical procedures such as infrared spectroscopy, gas liquid phase chromatography, nuclear magnetic resonance spectroscopy, high pressure liquid chromatography, and the like. When the above noted proportion of aminals has been found to be converted to benzylamines, the organic phase of the reaction product is separated from the solid catalyst e.g. by filtration, centrifugation and the like, and subjected to the next step of the process of the invention.

In this next step of the process of the invention part, but not all, of the excess aniline, present in the benzylamines obtained in the previous step, is removed. The distillation is advantageously carried out under reduced pressure, at temperatures not greater than about 150° C. The proportion of aniline which is removed, or, more precisely, the proportion of aniline which is allowed to remain in the mixture after the distillation, is controlling as far as the proportion of di(aminophenyl)methane formed in the ultimate reaction product is concerned. Thus, it is found that, if the amount of aniline in the benzylamines is reduced to about 3 percent by weight, the ultimate mixture of polyamines will contain approximately 40 percent of diamine. Similarly, 6 percent, 8 percent, 10 percent, 12 percent, 14 percent, 16 percent and 22 percent of aniline remaining in the mixture of benzylamines will give rise to polyamine products in which the diamine content is about 44, 46, 48, 50, 54 and 60 percent by weight, respectively. In a preferred embodiment, the amount of aniline in the benzylamines is adjusted to about 6 percent to 16 percent of the mixture whereby the diamine content achieved in the final polyamine mixture is from about 44 to about 54 percent by weight.

The progress of removal of aniline from the benzylamine mixture can be followed by examining aliquots of the undistilled product by any of the above-mentioned analytical techniques. When the desired level, within the above range, of aniline in the undistilled benzylamine mixture is reached, the resulting product is then subjected to the final step in the process of the invention.

In this final step the mixture of benzylamines, with aniline content adjusted to the desired level as described above, is again contacted with a solid catalyst which can be any of the diatomaceous earths, clays or zeolites employed in the previous stage of conversion of dry aminals to benzylamines. Any of the procedures discussed above for contacting the benzylamines with the solid catalyst can be employed. The proportion of solid catalyst to benzylamines is of the same order as that employed in treatment of the aminals. The minimum proportion is about 1 percent by weight and the upper proportion is not critical; 10 percent by weight is an economical upper limit but higher amounts can be used without affecting the outcome of the process.

The benzylamines and solid catalyst are contacted and maintained at a temperature within the range of about 100° C to about 190° C until examination of an aliquot, by one or more of the analytical technique discussed above, shows that conversion of benzylamines to methylene polyphenyl polyamines is complete. It is to be noted that the higher end, e.g. about 160° C to about 190° C, of the above temperature is employed when the reaction is being conducted on a batch basis. The lower range of temperatures is more appropriate when using continuous techniques discussed below.

When the conversion of benzylamines is found to be complete, the organic phase is separated from the solid catalyst by filtration, centrifugation, and the like, and the excess aniline present in the reaction mixture is removed, if desired, by distillation advantageously under reduced pressure.

There is thus obtained a mixture of methylene polyphenyl polyamines which contains from about 40 to about 60 percent of di(aminophenyl)methane depending upon the proportion of aniline in the benzylamines employed in the last stage. Of the di(aminophenyl)methane present in the reaction mixture approximately 75 percent by weight is present as 4,4'-isomer, the remainder being largely 2,4'-isomer with only a minor amount (about 2 percent or less) of 2,2'-isomer. The major portion of the methylene polyphenyl polyamines of higher molecular weight present in the reaction product is found to be triamine, the next major component being tetramine. The proportion of higher oligomeric materials (i.e. higher molecular weight than tetramines) in the product is found to be small (less than about 5 percent). These findings indicate that the distribution of the various components in the reaction product is markedly different from that encountered in similar products, obtained by the acid condensation of aniline and formaldehyde, hitherto known in the art. The remarkably low proportion of higher oligomers is responsible for the novel and highly useful properties of the corresponding mixture of polymethylene polyphenyl polyisocyanates to which the above mixture of polyamines can be converted by phosgenation using procedures well known in the art.

Thus, the polymethylene polyphenyl polyisocyanates, so obtained are characterized by a lower equivalent weight, of the order of 128 to 130, than corresponding products known in the art. Further, the polyisocyanates are light in color and have markedly lower viscosity retaining their mobility down to about 0° C. All of these are clear differences in behaviour as compared with prior products. Most importantly, the polymer foams, such as polyurethane and polyisocyanaurate foams, prepared from these polyisocyanates are substantially white in color as compared to the undesirable brown color commonly associated with the foams from prior art polyisocyanates of this nature.

The process of the invention has been described so far largely in terms of a batch type procedure. However, as will be obvious to one skilled in the art, the process of the invention can be carried out readily on a continuous basis. For example, the initial stage of mixing of formaldehyde and aniline is carried out in a continuous tubular reactor, the aminals so obtained are separated from the water on a continuous basis and the aminals are passed through a bed or column of the solid catalyst. The latter is maintained at a temperature in the range set forth above for the conversion of the aminals to benzylamines and the rate of flow through the column or bed is controlled so that the residence time of the benzylamines in the column or bed is that required for the desired conversion. The material flowing from the column or bed is then subjected to distillation in a thin film evaporator or like continuous distillation apparatus, under reduced pressure, to remove the amount of aniline (as overhead) required to leave a residue to benzylamines having an aniline content in the range set forth above.

In the final step of the process of the invention, on a continuous basis, the reaction product from the continuous distillation is passed through a second column or bed of solid catalyst maintained at a temperature within the range set forth above, preferably in the lower end of said range, for the final step of the process of the invention. The residence time of the material in the column or bed is adjusted so that it corresponds to the time required for conversion of the benzylamines to the polymethylene polyphenyl polyamines at the particular reaction temperature employed.

The following examples describe the manner and process of making and using the invention and set forth the best mode contemplated by the inventors of carrying out the invention but are not to be construed as limiting.

EXAMPLE 1

(a) A total of 2,976.7 g. (32 moles) of aniline was charged to a 5 liter flask equipped with nitrogen inlet, thermometer, agitator, and addition funnel. The system was cooled to 10° C in an ice bath and maintained at that temperature while a total of 422.6 g. (5.2 moles) of 37% w/v aqueous formaldehyde was added continuously over a period of 30 minutes. After the addition was complete, the mixture was stirred for a further 1 hour at 10° C and then for a further 5 hours at ambient temperature (circa 20° C). The resulting product was transferred to a separating funnel and the lower aqueous phase was removed. The aminals so obtained were dried (in two aliquots of approximately 1.5 liter at 40° – 45° C under 0.1 mm. of mercury pressure for approximately 1 hour. There was thus obtained a total of 2995 g. of dried aminal (water content = 0.1 percent).

(b) A portion (1406 g.) of the dried aminal so obtained was mixed, with stirring, with 140.2 g. (10 percent by weight) of attapulgus clay (Engelhard, dried by heating at 150° C for 4 hours under vacuum) and the mixture was heated at 55° C with stirring for 5.5 hours. At the end of the latter period the nmr spectrum of an aliquot indicated that conversion of aminals to benzylamines was about 99 percent completed. The resulting product was filtered and the catalyst was washed on the filter with 200 ml. of methylene chloride. The combined filtrate and washings were evaporated under reduced pressure to remove methylene chloride. There was thus obtained 1395 g. of a mixture of benzylamines and excess aniline.

(c) A portion (200 g.) of the mixture of benzylamines and aniline obtained in (b) above was subjected to distillation at a pressure of 1.5 – 1.7 mm. of mercury for 1 hour with a vapor temperature of 51 to 53° C and an oil bath temperature of 100° C until a total of 131.2 g. of distillate (aniline) had been collected. The residue (68.4 g.) was found by gel permeation chromatography to contain 12.0 percent by weight of aniline.

(d) A mixture of 60.3 g. of the benzylamine reaction product obtained in (c) and 3 g. (5 percent by weight) of attapulgus clay (Engelhard, dried by heating at 150° C for 4 hours under vacuum) was heated at 180° C with stirring for 40 minutes until the nmr spectrum of an aliquot indicated completion of the conversion to methylene polyphenyl polyamines. The resulting product was filtered and the catalyst was washed on the filter with 50 ml. of methylene chloride. The combined filtrate and washings were evaporated to dryness to yield 59.9 g. of an amber colored fluid which was found by gel permeation chromatography to contain 19.1 percent by weight of aniline. The polyamine mixture contained 49.9 percent by weight of di(aminophenyl)-methane and 50.1 percent higher oligomers (of which approximately 95 percent were triamines and tetramines). The di(aminophenyl)methane component was found by vapor phase chromatography to contain 75 percent by weight of the 4,4'-isomer, 23.1 percent by weight of the 2,4'-isomer and 1.9 percent by weight of the 2,2'-isomer.

EXAMPLE 2

A second portion (200.0 g.) of the mixture of benzylamines and excess aniline obtained as described in Example 1, part (b), was subjected to distillation under reduced prssure using exactly the procedure described in Example 1, part (c). The distillation was continued until 135.2 g. of aniline had been collected. The undistilled residue (71.4 g.) contained 7.3 percent by weight of aniline, the remainder being benzylamines. The residue was then heated with 3 g. of attapulgus clay (Engelhard, dried by heating at 150° C for 4 hours under vacuum) at 180° C with stirring using the procedure described in Example 1, part (d). Conversion of benzylamines to methylene polyphenyl polyamines were completed in 40 minutes. The resulting mixture was filtered and the solid catalyst was washed on the filter with methylene chloride (50 ml.). The combined filtrate and washings were evaporated to dryness to obtain 59.9 g. of amber-colored liquid which was found to contain 13.9 percent by weight of aniline, the remainder being methylene polyphenyl polyamines of which 44 percent by weight was di(aminophenyl)methane and 56 percent by weight was higher oligomers of which approximately 95 percent were triamines and tetramines. The di(aminophenyl)methane component was found by vapor phase chromatography to contain 75.6 percent by weight of 4,4'-isomer, 21.2 percent by weight of 2,4'-isomer and 3.2 percent of 2,2'-isomer.

EXAMPLE 3

A third portion (200.0 g.) of the mixture of benzylamines and excess aniline obtained as described in Example 1, part (b). was subjected to distillation under reduced pressure using exactly the procedure described in Example 1, part (c). The distillation was continued until 129.6 g. of aniline had been collected. The undistilled residue (70.3 g.) contained 12.2 percent by weight of aniline, the remainder being benzylamines. This residue was then heated with 3 g. of attapulgus clay (Engelhard, dried at 150° C for 4 hours under vacuum) at 180° C with stirring using the procedure described in Example 1, part (d). Conversion of benzylamines to methylene polyphenyl polyamines was complete in 30 minutes. The resulting mixture was filtered and the solid catalyst was washed on the filter with methylene chloride (50 ml.). The combined filtrate and washings were evaporated to dryness to obtain 69.8 g. of amber colored liquid which was found to contain 20.5 percent by weight of aniline, the remainder being methylene polyphenyl polyamines of which 49.9 percent by weight was di(aminophenyl)methane and 50.1 percent by weight was higher oligomers of which approximately 95 percent consists of a mixture of triamines and tetramines. The di(aminophenyl)methane component was found by vapor phase chromatography to contain 73.2 percent by weight of 4,4'-isomer, 24.6 percent by weight of 2,4'-isomer and 2.2 percent of 2,2'-isomer.

EXAMPLE 4

An aliquot of 54.0 g. of the mixture of aniline and methylene polyphenyl polyamines obtained as described in Example 1 was phosgenated, without separating the aniline, using the following procedure.

Gaseous phosgene (250.5 g.) was added over a period of 90 minutes to 500 ml. of monochlorobenzene maintained at 2° to 5° C. The resulting mixture was stirred and maintained at 2° to 5° C while the above mixture of amines (59.9 g.) in 150 ml. of hot (80° C) monochlorobenzene was added continuously over a period of approximately 30 minutes. The resultant slurry was stirred for an additional 0.5 hour at 5° to 10° C after the addition was complete and then for a further 45 minutes at room temperature. The temperature of the reaction mixture was then gradually raised to 55° to 60° C at which point vigorous decomposition of the intermediate carbamyl chloride commenced. When the decomposition subsided, the temperature of the reaction mixture was raised to approximately 90° C whereupon a slow stream of phosgene was passed into the mixture and maintained while the reaction mixture, over a period of 45 minutes, was raised to reflux temperature (130° to 132° C). The resulting mixture was purged with nitrogen for a period of 1.5 hr. and then distilled at 50° C and 20 mm. of mercury until the volume of the mixture had been reduced by 25 percent. The resulting solution was filtered to remove a small amount (0.54 g.) of insoluble material and the filtrate was stripped of remaining monochlorobenzene and phenyl isocyanate under reduced pressure with a final flask temperature of 125° C at 0.5 mm. of mercury. The residue (53.2 g.) was a light brown fluid having an isocyanate equivalent of 129.5. The polymethylene polyphenyl polyisocyanate so obtained was found by gel permeation chromatography to contain 41.1 percent by weight of methylenebis(phenyl isocyanate) and 58.9 percent by weight of the oligomeric polyisocyanates (mainly tri- and tetraisocyanates). The methylenebis(phenyl isocyanate) present in the mixture was shown by vapor phase chromatography to contain 75.5 percent by weight of the 4,4'-isomer, 23.4 percent by weight of the 2,4'-isomer and 1.1 percent by weight of the 2,2'-isomer.

EXAMPLE 5

Using the procedure described in Example 4, a portion (55.0 g.) of the mixture of aniline and polyamines prepared as described in Example 2 was phosgenated to obtain 54.0 g. of polymethylene polyphenyl polyisocyante as a light brown freely flowing fluid having an isocyanate equivalent of 128. The polymethylene polyphenyl polyisocyanate so obtained was found by gel permeation chromatography to contain 40.1 percent by weight of methylenebis(phenyl isocyanate) and 59.9 percent by weight of the oligomeric polyisocyanates (the major portion of the latter being tri- and tetraisocyanates). The methylenebis(phenyl isocyanate) present in the mixture was shown by vapor phase chromatography to contain 77.0 percent by weight of the 4,4'-isomer, 21.7 percent by weight of the 2,4'-isomer and 1.4 percent by weight of the 2,2'-isomer.

EXAMPLE 6

Using the procedure described in Example 4, a portion (54.0 g.). of the mixture of aniline and polyamines prepared as described in Example 3 was phosgenated to obtain 52.5 g. of polymethylene polyphenyl polyisocyanate as a mobile, light brown fluid having an isocyanate equivalent of 128. The polymethylene polyphenyl polyisocyanate so obtained was found by gel permeation chromatography to contain 43.0 percent by weight of methylenebis(phenyl isocyanate) and 57.0 percent by weight of the oligomeric polyisocyanates (the major portion being tri- and tetraisocyanates). The emthylenebis(phenyl isocyanate) present in the mixture was shown by vapor phase chromatrography by contain 76.0 percent by weight of 4,4'-isomer, 22.9 percent by weight of 2,4'-isomer and 1.0 percent by weight of 2,2'-isomer.

EXAMPLE 7

Rigid polyurethane foams were prepared under identical conditions from each of the polymethylene polyphenyl polyisocyanates prepared as described in Examples 4 – 6, using the following procedure:

In each instance a mixture of 82.5 g. (0.79 equiv.) of a polyol of equivalent weight 104 (obtained by Mannich condensation of nonylphenol, diethanolamine and formaldehyde followed by the addition of propylene oxide), 2.0 g. of organosilicone surfactant (DC-193; Dow Corning) and 27 g. of trichlorofluoromethane was blended mechanically and to the mixture was added 93 g. (0.73 equiv.) of the polymethylene polyphenyl polyisocyanate with high speed mechanical stirring for 10 seconds. The resulting mixture was then allowed to foam freely in a paper cup. The resulting foams were each white in color and exhibited fine uniform cells.

We claim:

1. A polymethylene polyphenyl polyisocyanate which is the product of phosgenation of a mixture of methylene polyphenyl polyamines which contains from about 40 to 60 percent by weight of di(aminophenyl)methanes and which has been obtained by
   (a) reacting aniline and formaldehyde in a proportion within the range of 4 moles to 10 moles of aniline per mole of formaldehyde at a temperature of 20° C to 60° C and in the absence of catalyst to form a mixture of aminals;
   (b) separating water from said aminals;
   (c) contacting the aminals so obtained with at least about 1 percent by weight of a solid catalyst selected from the class consisting of diatomaceous earths, clays, and zeolites at a temperature of about 20° C to about 60° C until from 80 to 100 percent by weight of the aminals has been converted to benzylamines;
   (d) subjecting the benzylamines so obtained to distillation under reduced pressure at a temperature not greater than 150° C to remove aniline until the aniline content of the undistilled fraction is within the range of about 3 to 22 percent by weight; and
   (e) contacting said undistilled fraction with at least about 1 percent by weight of a solid catalyst selected from the class consisting of diatomaceous earth, clays, and zeolites at a temperature of about 100° C to 190° C until conversion to methylene polyphenyl polyamines is complete.

* * * * *

UNITED STATES PATENT OFFICE
CERTIFICATE OF CORRECTION

Patent No. 4,092,343　　　　　　　　Dated May 30, 1978

Inventor(s) Floro F. Frulla, Adnan A. R. Sayigh, Henri Ulrich and Peter J. Whitman It is certified that error appears in the above-identified patent and that said Letters Patent are hereby corrected as shown below:

Column 3, line 16:　　　　　　　　Should read:

$C_6H_5NH_3$　　　　　　　　　　　　$C_6H_5NH_2$

Column 4, line 49:　　　　　　　　Should read:

George Kaolin　　　　　　　　　　Georgia Kaolin

Column 5, line 23:　　　　　　　　Should read:

(or about 65 mesh)　　　　　　　(or above 65 mesh)

Column 5, lines 60 to 64:　　　　Should read:

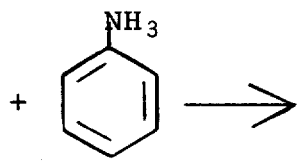 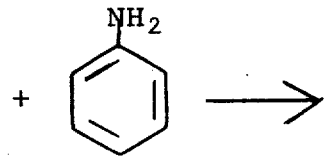

Column 6, line 39:　　　　　　　　Should read:

50, 54　　　　　　　　　　　　　　50, 52, 54

UNITED STATES PATENT OFFICE
CERTIFICATE OF CORRECTION

Patent No. 4,092,343　　　　　　　　　Dated May 30, 1978

Inventor(s) Floro F. Frulla, Adnan A. R. Sayigh, Henri Ulrich and Peter J. Whitman It is certified that error appears in the above-identified patent and that said Letters Patent are hereby corrected as shown below:

Column 9, line 51:　　　　　　　　Should read:

(b). was subjected　　　　　　　　(b), was subjected to
distillation　　　　　　　　　　　distillation Column 11, lines 17 and 18:　　　Should read:

by contain　　　　　　　　　　　　to contain

Signed and Sealed this

*Thirty-first* Day of *October 1978*

[SEAL]

Attest:

RUTH C. MASON　　　　　　　　　　DONALD W. BANNER
*Attesting Officer*　　　　　　　*Commissioner of Patents and Trademarks*